Aug. 11, 1953

F. B. BURT 2,648,541

RECORD CHANGER APPARATUS

Filed Oct. 26, 1949

4 Sheets-Sheet 1

INVENTOR.
FARLOW B. BURT
BY Cecil D. Arens
ATTORNEY

INVENTOR.
FARLOW B. BURT
BY Cecil J. Arens
ATTORNEY

INVENTOR.
FARLOW B. BURT
BY Cecil J. Avers
ATTORNEY

Aug. 11, 1953 F. B. BURT 2,648,541

RECORD CHANGER APPARATUS

Filed Oct. 26, 1949 4 Sheets-Sheet 4

INVENTOR.
FARLOW B. BURT
BY
Cecil J. Arens
ATTORNEY

Patented Aug. 11, 1953

2,648,541

UNITED STATES PATENT OFFICE 2,648,541

RECORD CHANGER APPARATUS

Farlow B. Burt, South Bend, Ind., assignor to Bendix Aviation Corporation, South Bend, Ind., a corporation of Delaware Application October 26, 1949, Serial No. 123,626

7 Claims. (Cl. 274—10)

This invention relates to phonograph apparatus and more particularly to record supporting and releasing mechanism therefor.

Many of the present day record changers are of the slicer-drop type of record feed to the turntable or the type in which the records are pushed over an offset on the center spindle. Record mortality with either type is too high. In the case of the first mentioned type the peripheral edges of the records soon become chipped and broken to the point that they are not usable. As for the second named type the center holes of the records soon become enlarged to the extent that the records must be discarded.

It is therefore a purpose of this invention to provide a mechanism free of the disadvantages of the aforementioned changers.

An object of the invention resides in the provision of a record supporting and releasing mechanism wherein the lowermost record of a stack is shifted from under said stack through the action of oscillatable plates arranged for engagement with the edge of said record.

The above and other objects and features of the invention will be apparent from the following description of the apparatus taken in connection with the accompanying drawings which form a part of this specification, and in which.

Figure 1:
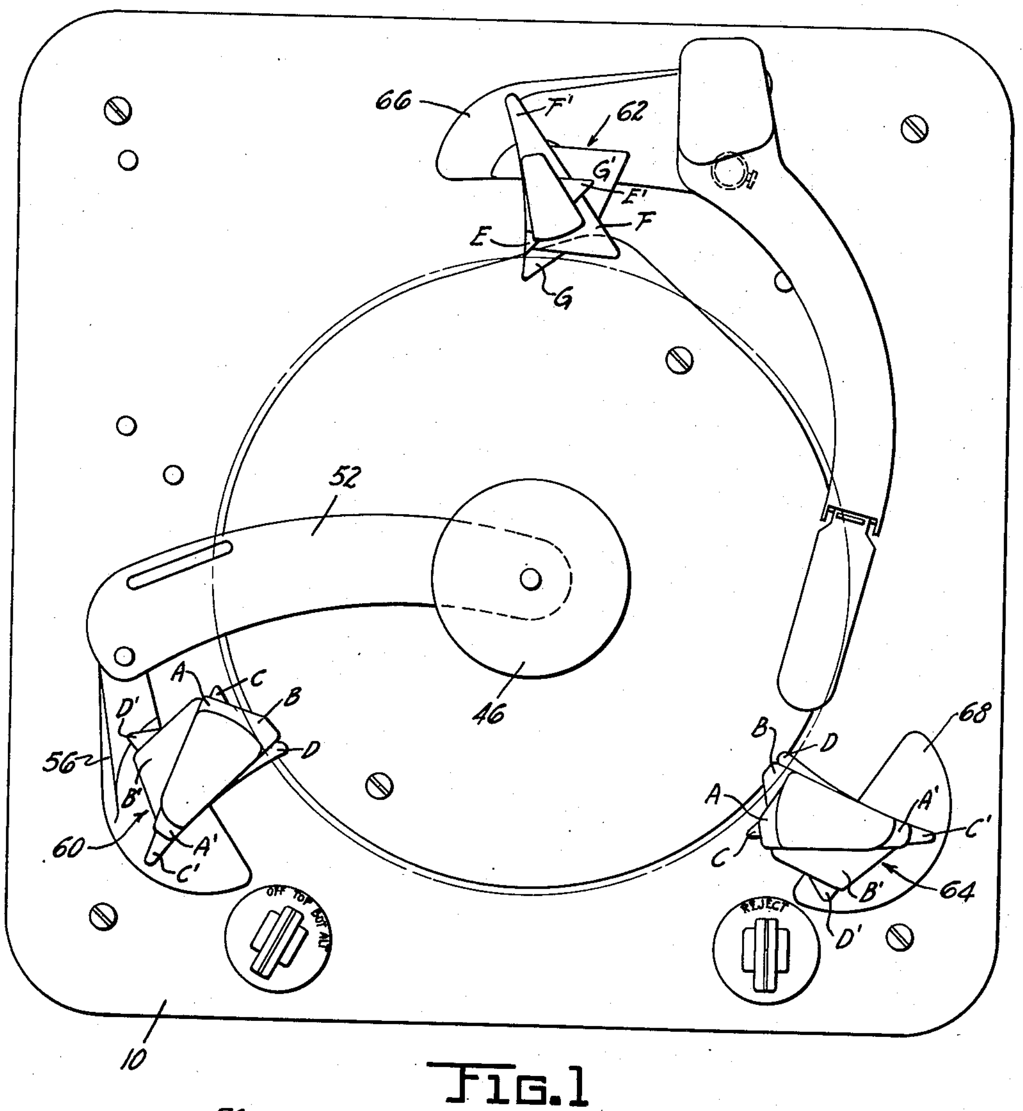
Figure 1 is a top plan view of the apparatus of the invention, with the record releasing and supporting means set for handling a stack of 10 inch records.
Figure 2:
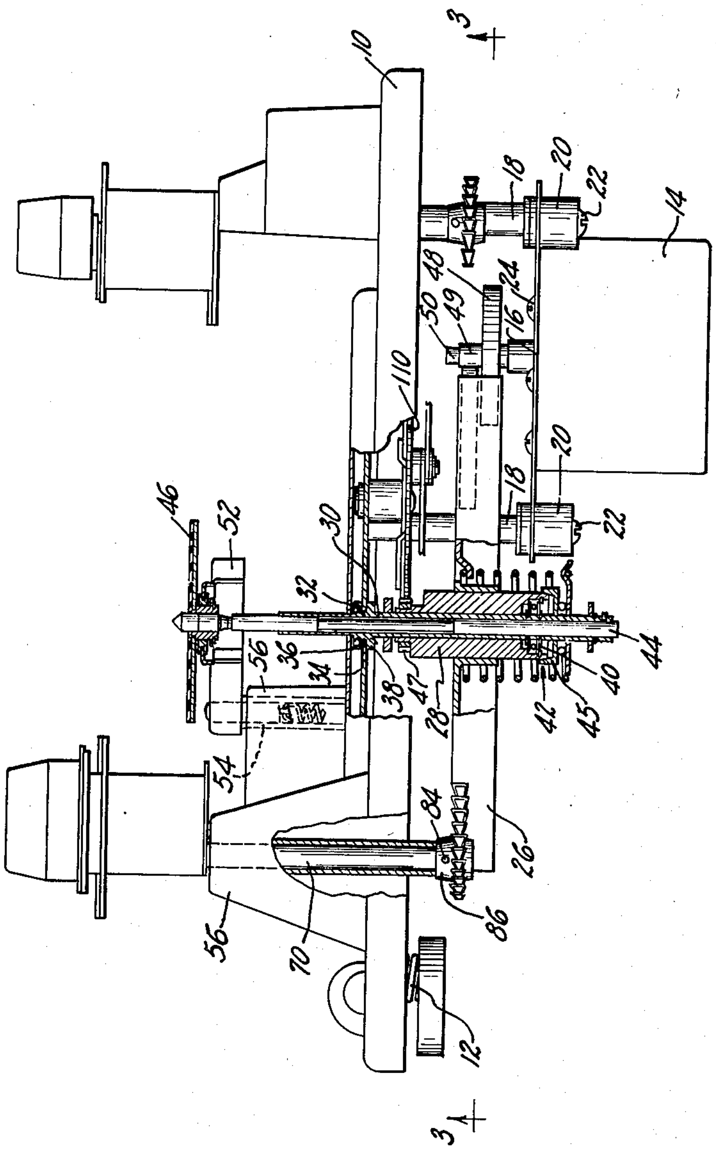
Figure 2 is a view in side elevation of the apparatus of Figure 1.
Figure 3:
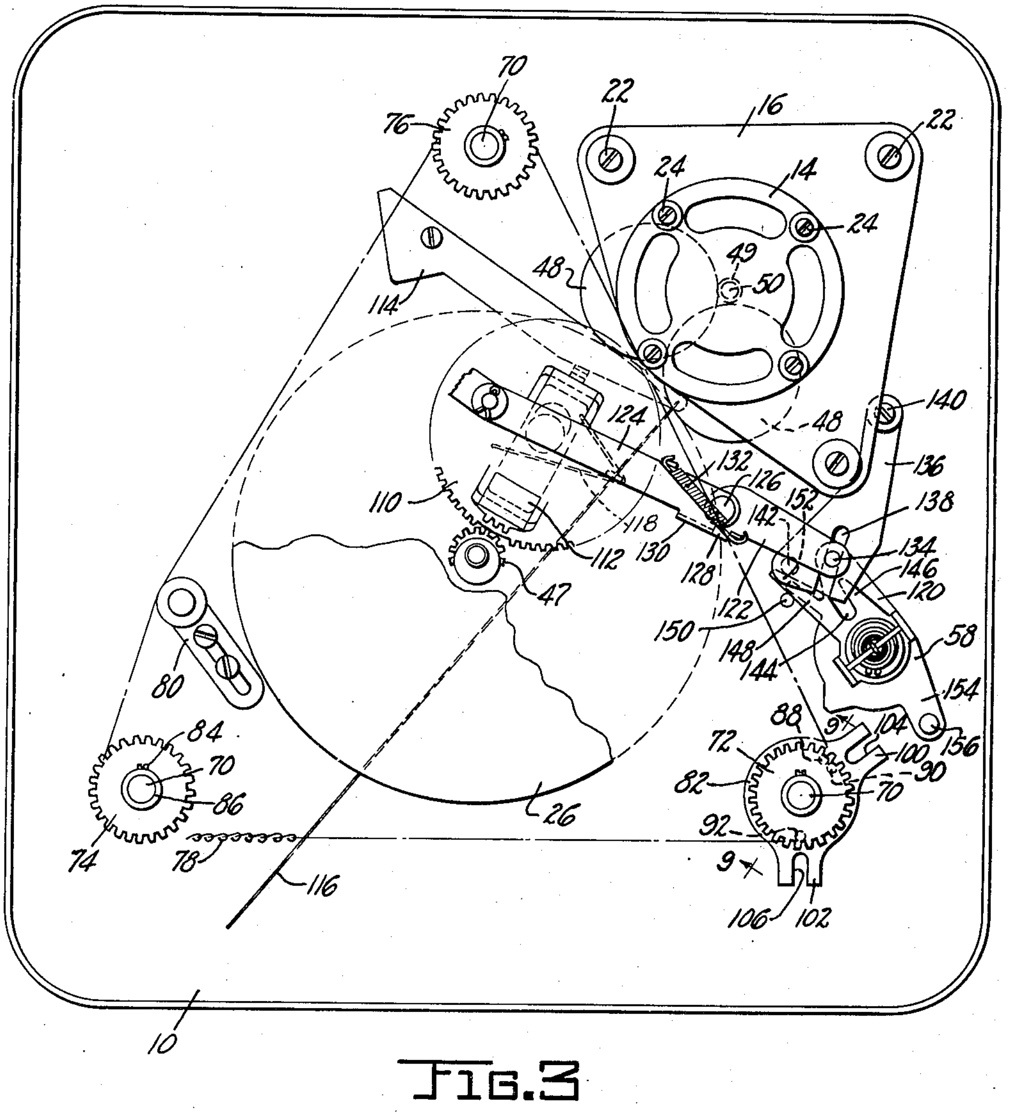
Figure 3 is a view of the underside of the apparatus taken on the line 3—3 of Figure 2 with parts omitted for sake of clarity.
Figure 4:
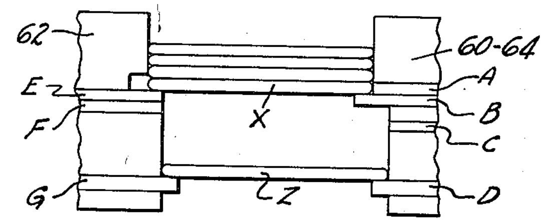
Figures 4 to 8 are diagrammatic representations of the movement of a record from the bottom of a stack.
Figure 7:
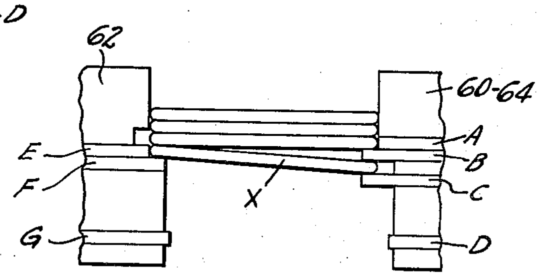
Figure 5:
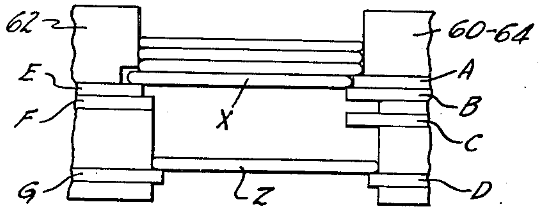
Figure 8:
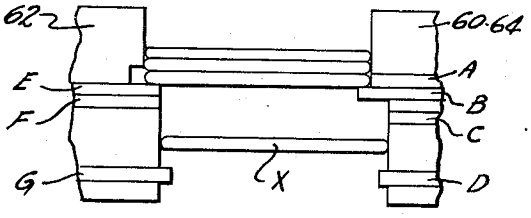
Figure 6:
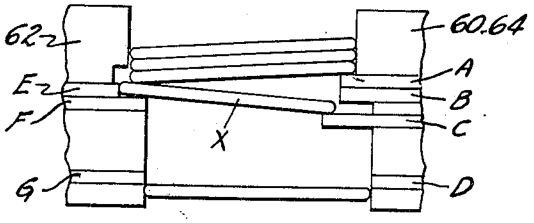

Referring now to Figures 1 to 3 of the drawings the reference numeral 10 designates a platform, which is supported in any suitable manner on vibration damping mountings or springs 12. The power for driving the apparatus is furnished by a single phase capacitance type reversible motor 14 carried on a mounting plate 16 supported beneath the platform by depending rods 18. The ends of the rods to which the plate 16 is mounted are equipped with rubber grommets 20 secured to the rods by screws 22. The plate 16 is thus floatably suspended in these grommets to thereby minimize the transfer of vibrations into the platform. The motor in turn is fastened to the mounting plate by screws 24.

A continuously rotating drive wheel 26, having a hub 28, is supported on the underside of the platform by a tubular support member 30, provided with an enlarged threaded section 32, extending through an opening 34 in the platform, for threadedly receiving a locknut 36, which, when tightened will draw an expanded annular portion 38, integral with the support 30, against the bottom side of the platform so as to hold said support in rigid relationship to the platform. The lower end of the hub 28 is carried by a bearing assembly 40 mounted at the bottom end of the tubular support. A spring urged clutch 42 is interposed between the drive wheel and a shaft 44 extending through the tubular member above and below the platform. The lower end of said shaft 44 carries a portion 45 of the clutch 42 while the upper end of said shaft is formed for driving engagement with a turntable 46. The shaft 44 is disengageably connected to the turntable. A pinion gear 47 is keyed to the upper end of the hub. The turntable drive mechanism is per se claimed in my application Serial No. 118,553, filed September 29, 1949.

A pair of wheels 48 are interposed between the periphery of the drive wheel 26 and a pulley or sleeve 49, secured to a shaft 50 of the motor 14, to thereby connect the drive wheel to the motor for rotation in a clockwise or counterclockwise direction.

The turntable 46 is supported on an arm 52 mounted on one end of a hollow shaft 54 which fits into a boss 56 integral with the platform. The lower end of the hollow shaft 54 extends below the platform where a positioner plate 58 is secured thereto. See Figure 3.

The invention herein resides in the record supporting and releasing means which comprises a set of three supports 60, 62, and 64 rotatably carried respectively by the posts or bosses 56 and 66, one of which forms a thrust bearing for the shaft 54 of the turntable arm, and a third boss 68. These posts or bosses are fastened to the top side of the platform in any suitable manner, not shown.

Figure 1 shows the position of the record supporting and releasing means when the changer is set for 10 inch records. Of the three sets of supports for the record supporting and releasing means, two of the sets are of identical construction and only one of these will be described in detail. The two identical sets of supports 60 and 64 are pivotally carried in posts 56 and 68. The record support 64, carried by post 68, is provided with a stem 70 which has its lower end extending below the platform. As best shown in Figures 1 and 2 the record support 64 is equipped with a set of four tiers or levels A, B, C, and D for the 10 inch records and A', B', C', and D' for 12 inch records. The third record support 62 is also furnished with a similar stem 70 which extends through the post 66 but differs in other respects from the record supports 60 and 64. The record support 62 is furnished with only three tiers or levels E, F, and G for 10 inch records and E', F', and G' for 12 inch records.

The ends of the three stems 70 which project below the platform 10 are equipped with sprockets 72, 74, and 76 over which a chain 78 travels, thus connecting the three sets of supports together for simultaneous rotation. An idler adjustment 80 is secured to the underside of the platform for controlling the tension in the chain 78.

Figure 9:
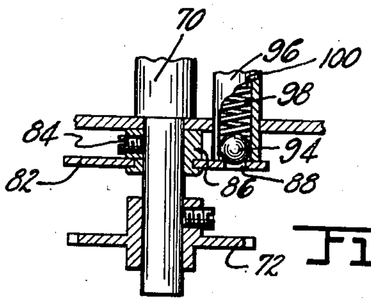
Figure 9 is a view in section taken on the line 9—9 of Figure 3.

In order to accurately position the record supports as well as hold the supports in a preselected position for playing either 10 or 12 inch records a detent mechanism is provided. See Figures 3 and 9. This mechanism comprises a plate 82 drivably secured to the stem 70 of the record support 60 by a set screw 84 threadedly disposed within a hub 86 integral with the plate 82. The plate is formed with three radially located openings 88, 90, and 92, angularly spaced apart on the same circumference a prescribed distance to facilitate positioning of the record supports for manual and automatic playing. A ball 94 is loosely disposed within a hollow projection 96, integral with the post 56. A spring 98 is positioned in the hollow projection so that one end of the spring abuts a shoulder 100 and the free end of the spring rides against the ball 94, to thereby urge the ball downwardly against the plate 82. The plate is provided with lateral projections 100 and 102, formed with radial extending slots 104 and 106 respectively, to be engaged by a mechanism to be hereinafter described, for positioning the record supports for 10 and 12 inch records. It will be noted that when the machine is set for automatically playing 10 inch records the opening 90 in the plate 82 will be engaged by the ball 94.

With reference to Figures 4 to 8, a stack of 10 inch records is placed on the supports for feeding the records to the turntable one at a time from the bottom of the stack. The lowermost record of the stack rests on tiers B of the supports 60 and 64 and tier E of support 62. In cycling the machine to transfer the lowermost record X from the stack to the tiers D and G where the record is to be picked up by the turntable the following sequence of record movement takes place: The three record supports are caused to rotate or oscillate clockwise so that the identical tiers A, which are located above tiers B on which the stack rests, engage the edge of the lowermost record X thus urging it in a horizontal plane so that the record slides along tier E. At the same time that tiers A are urging the record in the aforementioned direction tier E is being rotated out from under the record and tier C is being rotated to a position directly beneath the record to provide temporary support for the record until dropped to tier D. Movement of the tiers in the clockwise direction continues until one edge of the record is pushed off tiers B onto tiers C and the opposite edge of the record is dropped from tier E onto tier F, at which time the rotation of the supports is reversed. At the time of reversal the record is suspended temporarily on tiers C and F and the stack is carried by tiers A and F. See Figures 6 and 7. It will be remembered that tier A urged the lowermost record off tier B and simultaneously slid under the stack to support it temporarily during clockwise rotation of the supports. Tier E likewise moved out from under the record and is at the same level as the record, which is now resting on tier F. See Figure 6.

Rotation of the supports in a counterclockwise direction causes tier E to engage the edge of the record as this tier returns, thus sliding the record X off tier F. Concurrently with moving one edge of the record off tier F by tier E, the opposite side of the record was suspended by tier C, which was withdrawing in timed relationship to the action of tiers E and F, to thereby drop the record onto the bottom tiers D and G. See Figure 8.

If a record Z had been resting on tiers D and G at the time a cycle was initiated this record will have been deposited on the platform below the turntable. The tiers D and G rotate out from under the record Z, deposited thereon, in timed relationship to the transfer of the lowermost record X which is resting on tiers B and E, to tiers C and F. See Figure 6.

In the present construction, as best shown in Figure 2, the turntable is positioned slightly above the level of the tiers D and G. Therefore the record, when dropped in Figure 8 falls onto the turntable, and the supports D and G act as stabilizers to keep the record from tipping off of the turntable. The supports also stabilize the record when the turntable is swung out to deposit the played record on the platform below the turntable.

For operating the record supporting and releasing mechanism and for positioning the turntable beneath a stack of records the pinion gear 47 is caused to intermesh with an interrupted gear 110, rotatably secured to the underside of the platform. A gear sector 112 is slidably positioned on the interrupted gear for engagement with the pinion. A reject lever 114 is pivotally fastened on the underside of the platform with one end arranged for engagement with the gear sector 112. A rod 116 has one end connected to the reject lever with the other end of the rod terminating at the upper side of the platform where it will be accessible to the operator of the machine, for initiating a cycling operation to thereby change records. During a noncycling period the interrupted gear 110 is positioned so that a mutilated portion thereof is in registry with the pinion gear 47. At this time the gear sector is withdrawn from engagement with the pinion gear under the influence of a U-shaped spring 118, which has one end fixed to the interrupted gear, and its other end, or free end, in driving engagement with the gear sector.

A compound linkage interconnects the interrupted gear with the record supporting and releasing mechanism and the turntable positioner plate 58 and comprises an actuator plate 120, linked to a jack-knife connection, having levers 122 and 124. The actuator plate 120 rotates around the same center as the positioner plate 58 and revolves relative thereto. The ends of the levers 122 and 124 forming the jack-knife connection are pivotally joined together by a rivet 126. The contiguous ends of these two levers 122 and 124 are formed with mutually engageable portions 128 and 130 respectively, so that this jack-knife connection is rigid at times and collapsed at other times. A coiled spring 132 has its ends connected to the adjacent ends of the levers 122 and 124 so that the axis of the spring is below the center of pivot of the levers to thereby rotate the levers around the rivet 126 and bring the mutually engageable portions 128 and 130 together. Obviously if either lever 122 or 124 were rotated about rivet 126 so that the axis of the spring were above the center of the rivet, the jack-knife connection would collapse. Since the jack-knife connection performs a function required only for the general operation of the apparatus and forms no part of the present invention any further reference thereto is believed unnecessary. The details of the construction and function of this connection will be found in my application Serial No. 108,571, filed August 4, 1949.

The end of lever 124 opposite the jack-knife connection is pivotally secured to the interrupted gear 110 at a point off its center of rotation so as to impart a reciprocating motion to the lever 124 when the gear is revolved.

The jack-knife connection is interconnected with the actuator plate 120 through a pin 134. The actuator plate 120 and the lever 122 have their adjacent ends spaced apart vertically in different horizontal planes to receive a multiplying lever 136 therebetween, which is provided with a slot 138, into which the pin 134 slides. The multiplying lever 136 is pivotally fastened to the platform by a stud 140. The free end of the lever 136 is equipped with a pin 142, which rides in a slot 144 formed between fingers 146 and 148 of the turntable positioner plate 58. The finger 148 is slightly longer than the finger 146, so that the pin 142 will remain engaged with the first named finger to thereby rotate the plate 58 to the position shown, where the finger 148 abuts a stop 150. The actuator plate 120 is formed with an outwardly projecting element 152, which abuts the stop 150, to thereby position the plate at the end of a cycle. The arrangement of the pin 142 with respect to the slot 144 is such that the pin does not immediately move into the slot when the apparatus is cycled but does so only after the actuator plate has been rotated a predetermined angular distance depending on the amount of delay required before turntable movement is desired. This delay in swinging the turntable out from under a stack of records is necessary to allow for the withdrawal of the drive pin 44. This operation of the turntable drive is fully described in my application Serial No. 108,571, referred to above.

The actuator plate 120 is provided with an extension 154, on which is mounted a pin 156, adapted to engage in one or the other of slots 104 or 106, to thereby cycle the record supporting and releasing means. Whether the pin 156 engages in the slot 104 or 106 depends on if the record changer is set for playing 10 or 12 inch records, respectively.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. An automatic phonograph comprising a turntable, three oscillatable posts spaced around the turntable, each of said posts being provided with a plurality of plates affixed thereto for rotation therewith and disposed in tiers for successively supporting a record being transferred to said turntable, the plates of two of said posts being arranged thereon so that the top plates of the tiers are clear of the lowermost record of a stack but lie adjacent the edge of said record and on the same level therewith and the second plates of said tiers project under the periphery of the lowermost record of said stack, the plates of the third of said three posts being arranged so that the top plate of said tier projects under the periphery of the lowermost record of said stack and the second plate of said tier is clear of said lowermost record and on a level below said last named top plate a distance equal to substantially the thickness of a record, the top plate of said third post being arranged on the same level with a record resting on said last mentioned second plate, the tiers of said two posts being provided with a third plate located below the level of said other plates and clear of said lowermost record, and means for oscillating said posts in unison to cause the top plates of said two posts to engage the edge of said lowermost record to shift the same along the second plates of said two posts and the top plate of said third post, said top plate of said third post withdrawing from said lowermost record and said second plate of said last mentioned post rotating under said lowermost record, after which said third plates of the two posts are rotated under said lowermost record to support the same at its periphery temporarily until the top plate of said third post is returned to thereby urge the lowermost record off said second plate in timed relationship to withdrawal of said third plates from said record, to thereby release a record for deposit on said turntable.

2. In a phonograph apparatus provided with a turntable for supporting a record during the reproduction thereof, means for transferring a record from a record stack to said turntable and comprising three oscillatable posts circumferentially spaced apart adjacent said turntable, each of said posts being equipped with plates affixed thereto for rotation therewith and arranged in tiers for supporting a record above said turntable, the arrangement of the plates of two of said posts being such that said stack of records rests on the second plates of the tiers with the top plates thereof arranged on the same level as said lowermost record for engagement with the edge of the lowermost record of said stack, the arrangement of the plates of said third post being such that the lowermost record of said stack rests on the top plate with the second plate clear of said stack and on a level below said last named top plate, said top plate of the third post being on the same level as a record resting on said second plate of the last mentioned post for engagement with the edge of said lowermost record, and means for oscillating said posts simultaneously to first cause said lowermost record to be shifted to a temporary supporting position on the second plate of said third post and the third plates of said two posts, after which said posts are reversed in direction of rotation thus causing said last mentioned second and third plates to release said record for deposit on said turntable, said reversal of said posts also repositioning said second plates of the two posts and the top plate of said third post underneath said record stack.

3. A device of the class described in claim 2 wherein each of said posts is provided with an additional plate which performs a stabilizing function for a record dropped from said stack for deposit on said turntable.

4. A device of the class described in claim 2 wherein a record magazine is located beneath said stack of records and each of said posts is provided with an additional plate, said additional plates performing a dual function of intercepting a record dropped from said stack for deposit on said turntable and for supporting a played record for release to said magazine.

5. In a phonograph apparatus provided with means for supporting a record during the reproduction thereof, means for transferring a record from a record stack to said first named means and comprising three oscillatable posts spaced apart circumferentially with respect to said first named means, each of said posts being provided with a plurality of plates affixed thereto for rotation therewith and arranged in tiers for successively supporting a record above said first named means, two of said posts having three plates in a tier, one plate of each tier being arranged for engaging the underside of said lowermost record of said stack, a second plate in each tier being arranged to clear said lowermost record and rotatable into engagement with the edge thereof for shifting said record laterally, a third plate in each tier being arranged to clear said stack and rotatable thereunder to support a record temporarily before release to said turntable, the third oscillatable post having two plates in a tier, one plate being arranged for engaging the underside of said lowermost record of said stack and rotatable from under said stack, the second plate of said last mentioned tier being arranged for rotation into supporting relationship with the underside of said lowermost record when said one plate of said last mentioned tier is rotated from under said stack, said one plate of said last mentioned tier being rotatable into engagement with the edge of said lowermost record to thereby shift it laterally when it is supported on said second plate of the last mentioned tier, and means for oscillating said posts simultaneously to effect a transfer of a record from said stack to said first named means.

6. An automatic record changing apparatus comprising a device for supporting a record during the reproduction thereof, a mechanism for supporting a stack of records for release to said device including three oscillatable upright members spaced apart circumferentially around said stack of records, two of said upright members being provided with supporting elements fixed thereto and extending under the lowermost record of a stack and on which said stack rests, the third of said upright members being provided with a first supporting element fixed thereto and extending under the lowermost record of a stack and on which said stack rests, said two of said upright members being provided with additional supporting elements fixed thereto and arranged adjacent said lowermost record and in the same horizontal plane, said third of said upright members being provided with a second supporting element fixed thereto and located beneath the first supporting element and out from under said stack, said second supporting element being located on a level substantially the thickness of a record below said first supporting element for supporting a record with its edge adjacent to and in substantially the same plane as said first supporting element, said two upright members being provided with further supporting elements fixed thereto and located beneath said first mentioned supporting elements and out from under said stack, and means connecting all of said upright members for simultaneous rotation first in a direction to cause said first and second mentioned elements of the two upright members to release a record from the stack and to rotate said third mentioned element of said two upright members under said stack to provide a temporary support for said record and to transfer said record from said first named element of said third upright member to the second named element thereof and then in the reverse direction to effect release of said record from the third named element of said two upright members and from the second named element of said third upright member.

7. In a phonograph apparatus provided with means for supporting a record during the reproduction thereof, means for transferring a record from a record stack to said first named means and comprising three oscillatable posts each of which is provided with a plurality of plates affixed thereto for rotation therewith and arranged in tiers for successively supporting a record above said first named means, two of said posts having three plates in a tier, one plate of each tier being arranged for engaging the underside of said lowermost record of said stack, a second plate in each tier being arranged to clear said lowermost record and rotatable into engagement with the edge thereof for shifting said record laterally, a third plate in each tier being arranged to clear said stack and rotatable thereunder to support a record temporarily before release to said turntable, the third oscillatable post having two plates in a tier, one plate being arranged for engaging the underside of said lowermost record of said stack and rotatable from under said stack, the second plate of said last mentioned tier being arranged for rotation into engagement with the underside of said lowermost record when said one plate of said last mentioned tier is rotated from under said stack, said one plate of said last mentioned tier being rotatable into engagement with the edge of said lowermost record to thereby shift it laterally when it is supported on said second plate of the last mentioned tier, and means for oscillating said posts simultaneously first in a direction to cause the lowermost record of a stack to be transferred from said one plate of said two posts to said third plate of said two posts and from said one plate of said third post to said second plate of said third post and then in the reverse direction to cause said third plate of said two posts to withdraw from said record and said one plate of said third post to engage the edge of said record to move the same off said second plate of said third post.

FARLOW B. BURT.

References Cited in the file of this patent

UNITED STATES PATENTS

| Number | Name | Date |
|---|---|---|
| 2,300,668 | Habegger | Nov. 3, 1942 |
| 2,539,409 | Erbe | Jan. 30, 1951 |